United States Patent [19]

Bowman

[11] Patent Number: 4,527,714

[45] Date of Patent: Jul. 9, 1985

[54] PRESSURE RESPONSIVE HOPPER LEVEL DETECTOR SYSTEM

[75] Inventor: Harold L. Bowman, Batesville, Ark.

[73] Assignee: White River Technologies, Inc., Batesville, Ark.

[21] Appl. No.: 467,959

[22] Filed: Feb. 18, 1983

[51] Int. Cl.³ .............................................. B67D 5/08
[52] U.S. Cl. ........................................ 222/56; 222/64; 73/290 R
[58] Field of Search .................... 222/51, 64, 65, 56; 340/614, 617; 73/302, 303, 299, 290 R

[56] References Cited

U.S. PATENT DOCUMENTS

| | | | |
|---|---|---|---|
| 417,117 | 12/1889 | Thompson et al. | 340/617 |
| 2,640,977 | 6/1953 | Parisi . | |
| 2,696,114 | 12/1954 | Cummings | 340/617 |
| 2,696,606 | 12/1954 | De La Potmelie | 73/299 |
| 2,756,193 | 7/1956 | Bergstrom | 73/290 R |
| 2,846,879 | 8/1958 | Kauffman et al. | 340/617 |
| 2,883,862 | 4/1959 | Huber | 73/303 |
| 3,300,091 | 1/1967 | Wondrak et al. | 222/64 |
| 4,378,897 | 4/1983 | Kattelmann | 222/64 |

Primary Examiner—H. Grant Skaggs
Attorney, Agent, or Firm—Laurence R. Brown

[57] ABSTRACT

The level of such granular materials as fly ash and grain in a hopper presenting a differential internal hopper pressure above and below the level of materials in the hopper is sensed by sampling the pressure through a single flowless pressure conveying passageway extending by means of a port into the hopper interior. The pressure significantly changes above and below the level of materials. Thus, typically with a vacuum of about eight inches of water above the material level, the vacuum pressure is less than one-half an inch of water when the granular materials cover the port. Thus, a differential pressure gage connected between the atmosphere and the flowless pressure conveying passageway will indicate a significant difference in pressure when the level of materials covers the port. With a pressure gage operating relay contact an electric monitoring and control system may be used to automatically discharge the materials over long periods of time without maintenance.

7 Claims, 1 Drawing Figure

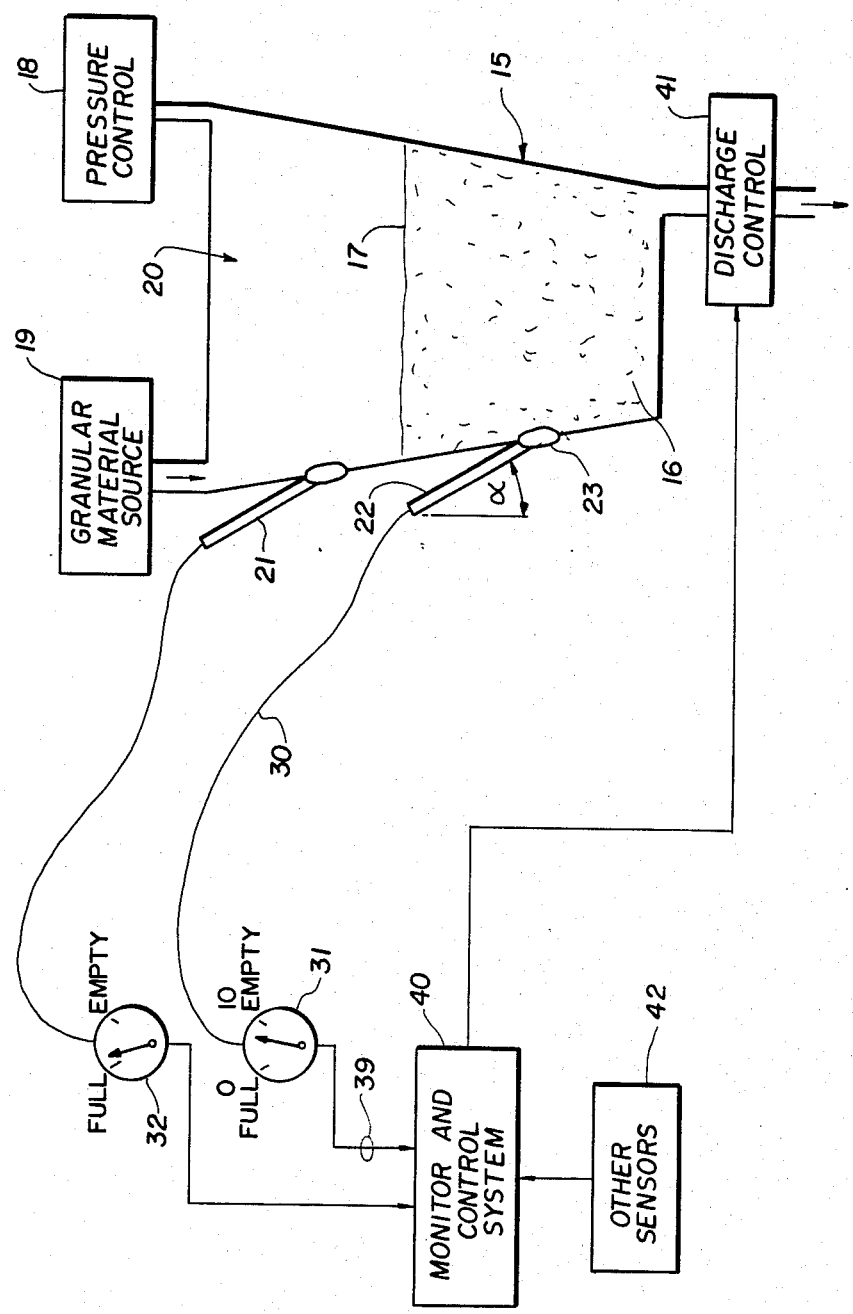

PRESSURE RESPONSIVE HOPPER LEVEL DETECTOR SYSTEM

TECHNICAL FIELD

This invention relates to level detectors and more particularly it relates to air pressure responsive systems for monitoring the level of granular materials and the like in hoppers or bins.

BACKGROUND ART

The prior art systems for sensing the level of granular materials such as fly ash or grain in bins or hoppers have posed several problems. Thus, for example, it is not always feasible to provide electrical wiring at a hopper site for powering gages or relaying detected indications. Even if feasible, the possibility of explosion in the presence of electrical sparks about the finely divided dust of a grain bin, for example, is a serious problem. Yet it is desirable to communicate as efficiently and directly as possible to electronic monitoring and analysis sytems such as computers, where electrical on-off signals are the preferable form of input.

Even when non-electric sensors are used, for example, air pressure gages, other similarly serious problems occur. If air flow paths need be piped into a hopper or bin this can be even more expensive and inconvenient than electrical circuitry. Also air flow paths can become clogged with silt and dirt, thereby drastically changing calibration and operability characteristics. If a pressure or vacuum air source need be supplied, the prior art sensing systems tend to be critically affected by changes of pressure that occur in the system during flow of materials into or from the hoppers, etc.

A typical prior art air pressure operated hopper content level indicating system is set forth in U.S. Pat. No. 2,640,977 to J. T. Parisi—June 2, 1953.

It is therefore a general object of this invention to improve the state of the art by providing pressure responsive level detector systems for correcting the foregoing prior art deficiencies.

DISCLOSURE OF THE INVENTION

In accordance with this invention, a non-critical pressure responsive hopper level detector system is provided which does not change in accuracy or sensitivity with changing pressure conditions normally encountered in the hopper operation. In other words, a threshold pressure detection level may be selected which threshold need not be changed with activity of the stored materials in the hopper or with variations of the pressure (or vacuum) supply source within wide limits.

Also in accordance with this invention, simple and non-critical installation is feasible that requires little maintenance or attention. Yet the system is well adapted to efficient and inexpensive interfacing with electronic monitoring or control systems such as computerized systems. Basically the produced signal is a binary type signal signifying the presence or absence of the materials being handled at one or more bin levels.

This is achieved simply by means of detector pipes at desired hopper levels communicating with the hopper interior, which is at less than atmospheric pressure, by a port through the hopper walls. These pipes, preferably inclined upwardly from the hopper walls at an acute angle such as 30°, are coupled by means of a flexible pressure line to a remote pressure gage at a position convenient to visually or electrically monitor the interior pressure at the port, which changes when the hopper is filled past the port.

It has been found in accordance with this invention that no air flow is required through the sensing pipes, and that the output reading on a pressure gage coupled to the port through the pipe is substantially atmospheric when the port is covered by materials within the hopper. This essentially permits a gage and detection system not subject to reading error or variation with different or changing hopper vacuum pressures. Only a single sampling port is necessary.

It has been found in accordance with this invention that the hopper internal air pressure (vacuum) only exists above the level of the granular materials, and that therefore a single sampling port will have a significant pressure change to establish substantially atmospheric pressure whenever the level of fly ash and other like granular materials cover the single sampling port.

It has been found that no air flow is necessary in the sampling line and port and that therefore no hopper materials enter the sampling line and port requiring cleaning of the line.

It has been found that it is not necessary to bleed the sampling line or otherwise to relieve static vacuum when the granular materials cover the sampling port, thereby preventing contamination of the line by accumulated dust, etc. that would occur with any flow path therethrough.

Other features, advantages and objectives of the invention will be found throughout the following description, the drawing and the claims.

BRIEF DESCRIPTION OF THE DRAWING

In the single FIGURE of the drawing is diagrammatically sketched a system embodying the invention to provide level detection of granular materials such as fly ash or grain in a bin or hopper by means of pressure detection gages.

THE PREFERRED EMBODIMENT

In the drawing, the hopper 15 receives a variable level 17 of granular material 16 accumulating in the lower portion of the hopper by force of gravity from a material source 19. If the material is grain, for example, the atmospheric dust is drawn off by pressure control means 18 to establish a vacuum in the hopper level 20 above the material level 17. Similarly if the hopper is a precipitator for fly ash the withdrawal of gases by means of the pressure control means 18 will establish a vacuum of about eight inches (20 cm) of water in the interior of the hopper above the fly ash level.

The interior pressure is not constant and may vary significantly in many uncontrolled pressure situations. Thus, it is desirable to produce a level sensing means that is not sensitive to such changes in pressure. Also, particularly in grain elevators, or the like, where fine dust may accumulate it is essential to keep any electric circuits or contacts which might arc away from the interior of the hopper 17 to avoid the danger of explosion. In general, it is desirable to have a system which is not subject to wear or that requires maintenance. Any systems requiring the flow of air can become clogged and require periodic cleaning. In accordance with this invention, however, there is no flow of air and electrical contacts, if used, are far removed from the vicinity of the atmosphere inside hopper 15.

In connection with the level sensing method and apparatus of this invention several surprising and unexpected characteristics of operation have been discovered, thereby making it possible to develop the disclosed pressure responsive level detecting system. Thus, it has been found that a hollow pipe 21 or 22 carrying a single pressure communication passageway through a port 23 in the hopper walls into the interior storage means would not as expected always be at the vacuum pressure established in the space 20 above the granular material level 17 in the hopper. Rather it was found that when the port 23 is covered with fly ash to close the mouth of the pipe 22 that the pressure reverts to a pressure closely approaching the atmospheric pressure outside the hopper walls, namely to below one-half inch (1.27 cm) of water vacuum pressure. Thus, a safe and inexpensive to install mechanism is provided which can sense the presence or absence of fly ash at the port 23.

Secondly, it was surprising to discover that no flow or circulation of air is required (into the hopper interior vacuum atmosphere), thereby permitting a sensor which requires only a single passageway through a single port for sensing of the presence or absence of the fly ash at that level. It has been found that a closed end flowless pressure confining channel that results requires no purge of air to clean the line or the port, particularly when the pipe 22 is mounted at an acute angle α to the vertical such as 30°, as shown. Apparently, the interior vacuum atmosphere serves to self purge any fly ash about the pipe interior walls at port 23 and the flowless, pipe configuration prevents entry of fly ash into the pipe in a contaminating sense. In a typical boiler precipitator site with a fly ash receiving hopper 15, the pipe 22 is three inches (7.6 cm) in diameter and about three feet (one meter) long. The solid granular materials thus simply do not enter the sampling port and thus purging or cleaning and maintenance is minimized.

Further the characteristics of the pressure confining pipe channel passageway surprisingly changes from a vacuum to even a slight positive pressure as the mouth becomes covered by fly ash depending upon the depth of the solid material. Thus, it is reasoned that the solid material serves to confine and compress entrapped air or gases below the level 17 of the material to thereby change the pressure within the detector pipe interior channel-way from a vacuum to substantially atmospheric pressure as the mouth at port 23 becomes covered. It is furthermore surprising that this action is found to self reverse without any necessity to purge the passageway by a relief valve or air flow at, during or after any reading. Thus, the metering device and method provided by this invention produces a continuous instantaneous reading indicating the presence or absence of fly ash at the sampling port (or several ports if different levels are of interest).

Accordingly, without gas flow or purge problems, a pressure confining flexible line 30, typically ⅜" (1 cm) in interior diameter of any reasonable length can serve as a conveyance means coupling the pipe 21, 22 to a remote measuring station at which a pressure meter 31 or 32 is employed to monitor the level of the fly ash, etc. This may be done typically by means of a pressure gage with a scale designed to distinguish between the two pressure levels above and below the fly ash level 17, as signified by the scale on meter 31. Thus a reading near 0 would indicate fly ash at the port 23, and a reading near 8 would indicate the level 17 below the port 23.

The other meter 32 designates either full or empty designations for the hopper as indicated by a differential pressure meter which compares the pressure channel pressure with atmospheric pressure to give either a small differential or a significant contrast. Note that in either case, however, the magnitude of vacuum pressure in the region 20 does not in any way seem to change the almost atmospheric reading below level 17, and thus all that is required is a gage sensitive enough to show a clear difference between a vacuum level at 20 and that with the port 23 covered.

The gages are preferably those conventionally available with built-in electronic conversion means such as a relay closing a set of contacts at a predetermined threshold such as the half inch of water indicative of the presence of fly ash at the sampling port. Then they can operate through electrical leads 39 a monitor and control system 40 to sample and record conditions and/or to automatically control corrective measures such as dumping excessive fly ash by a discharge control mechanism 41. Other sensors throughout a plant may be tied into a central control computer 40, or the like, as indicated by block 42.

It is therefore recognized that useful and improved pressure responsive level detector means and methods have been provided by this invention and that those novel features believed descriptive of the spirit and nature of the invention are defined with particularity in the appended claims.

I claim:

1. A level monitoring and control system to maintain the level of granular materials such as fly ash and grain in a storage hopper subject to variations of quantities of materials accumulating in the hopper, comprising in combination, a generally confined storage hopper for receiving granular materials having walls surrounding an interior storage region, means for variably discharging granular materials into the hopper to fall by gravity to a lower portion thereof and to reside therein at a variable level, means for removing granular materials from the hopper, pressure control means for establishing within the hopper in the region above the level of materials therein a pressure in the areas above and below the granular materials, a single hollow pipe means having a single communication passageway extending through a port in said hopper walls into said interior storage region, conveyance means coupling said pipe means passageway in a pressure confining flowless channel to a measuring station when the granular material in said hopper covers the port of said communication passageway, and pressure responsive detection means at said measuring station coupled to said conveyance means for providing an indication of the pressure in said communication passageway within limits distinguishing two conditions, one when said port is surrounded by the materials in the hopper, and the other when said port extends into a space above the level of materials in said hopper.

2. The system of claim 1 wherein said hollow pipe means comprises a section of pipe disposed on the hopper walls at an acute angle to vertical to define said single passageway therewithin.

3. The system of claim 1 wherein said pressure control means comprises means for evacuating said hopper to provide a vacuum therein.

4. The system of claim 1 wherein said detection means comprises a differential pressure gage comparing the pressure within said conveyance means with atmospheric pressure.

5. The system of claim 1 including detection means providing electrically responsive signals and further comprising a monitoring and control system coupled for automatic response to the sensed level of materials within said hopper.

6. The system of claim 1 wherein said hopper comprises fly ash precipitation means.

7. The method of detecting the level of granular materials such as fly ash in a hopper presenting a internal hopper pressure above and below the level of materials in the hopper, comprising the steps of,
sampling through a single flowless pressure conveying communication passageway extending into the hopper interior when the granular material in said hopper covers the port of said communication passageway so that the pressure at said port position in the hopper signifies a predetermined level of material, and
distinguishes whether the level of materials is above the port by means of significantly different pressure level in said passageway when the port is covered and uncovered by the granular materials.

* * * * *